United States Patent
Staltmeir

(10) Patent No.: US 6,799,813 B2
(45) Date of Patent: Oct. 5, 2004

(54) ELECTROMECHANICAL BRAKE ACTUATOR

(75) Inventor: Josef Staltmeir, Munich (DE)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 10/296,446
(22) PCT Filed: Dec. 13, 2001
(86) PCT No.: PCT/EP01/14682
 § 371 (c)(1),
 (2), (4) Date: Nov. 25, 2002
(87) PCT Pub. No.: WO02/47953
 PCT Pub. Date: Jun. 20, 2002

(65) Prior Publication Data
US 2003/0121734 A1 Jul. 3, 2003

(30) Foreign Application Priority Data
Dec. 13, 2000 (DE) .......................... 100 61 950

(51) Int. Cl.[7] ................................. B60T 8/36
(52) U.S. Cl. ..................... 303/119.3; 303/DIG. 10
(58) Field of Search ................. 303/119.3, DIG. 10

(56) References Cited
U.S. PATENT DOCUMENTS 4,760,898 A   8/1988   Nyquist
5,022,717 A * 6/1991  Heibel et al. ............ 303/119.3
5,407,260 A * 4/1995  Isshiki et al. ............ 303/119.3
5,769,508 A * 6/1998  Gilles et al. ............. 303/116.4
5,853,231 A * 12/1998 Iwamura et al. ......... 303/119.2
5,957,547 A * 9/1999  Schliebe et al. ......... 303/119.3
6,079,798 A * 6/2000  Hosoya ................... 303/119.3
6,250,335 B1 * 6/2001 Ohishi et al. ............... 137/884
6,412,754 B1 * 7/2002 Ogino et al. ........... 251/129.15
6,416,139 B2 * 7/2002 Warner et al. ........... 303/119.3
6,616,248 B2 * 9/2003 Obuse et al. ............. 303/119.3
6,662,825 B2 * 12/2003 Frank et al. ................ 137/557

FOREIGN PATENT DOCUMENTS
DE   196 15 186 C1   8/1997

OTHER PUBLICATIONS
VDI 3720 Blatt 1, Nov. 1980, pp. 12–15.

* cited by examiner

Primary Examiner—Robert A. Siconolfi
(74) Attorney, Agent, or Firm—Barnes & Thornburg LLP

(57) ABSTRACT

An electromechanical brake actuator for a rail vehicle brake, comprising: an actuator housing having a flange; electronic components; an electronic system housing having a flange and detachably connected with the actuator housing, and at least some of the electronic components being in the electronic system housing; at least one vibration damping element of the detachable connection arranged between a flange of the actuator housing and a flange of the electronic housing; and a clearance existing between the electronic system housing and the actuator housing.

9 Claims, 1 Drawing Sheet

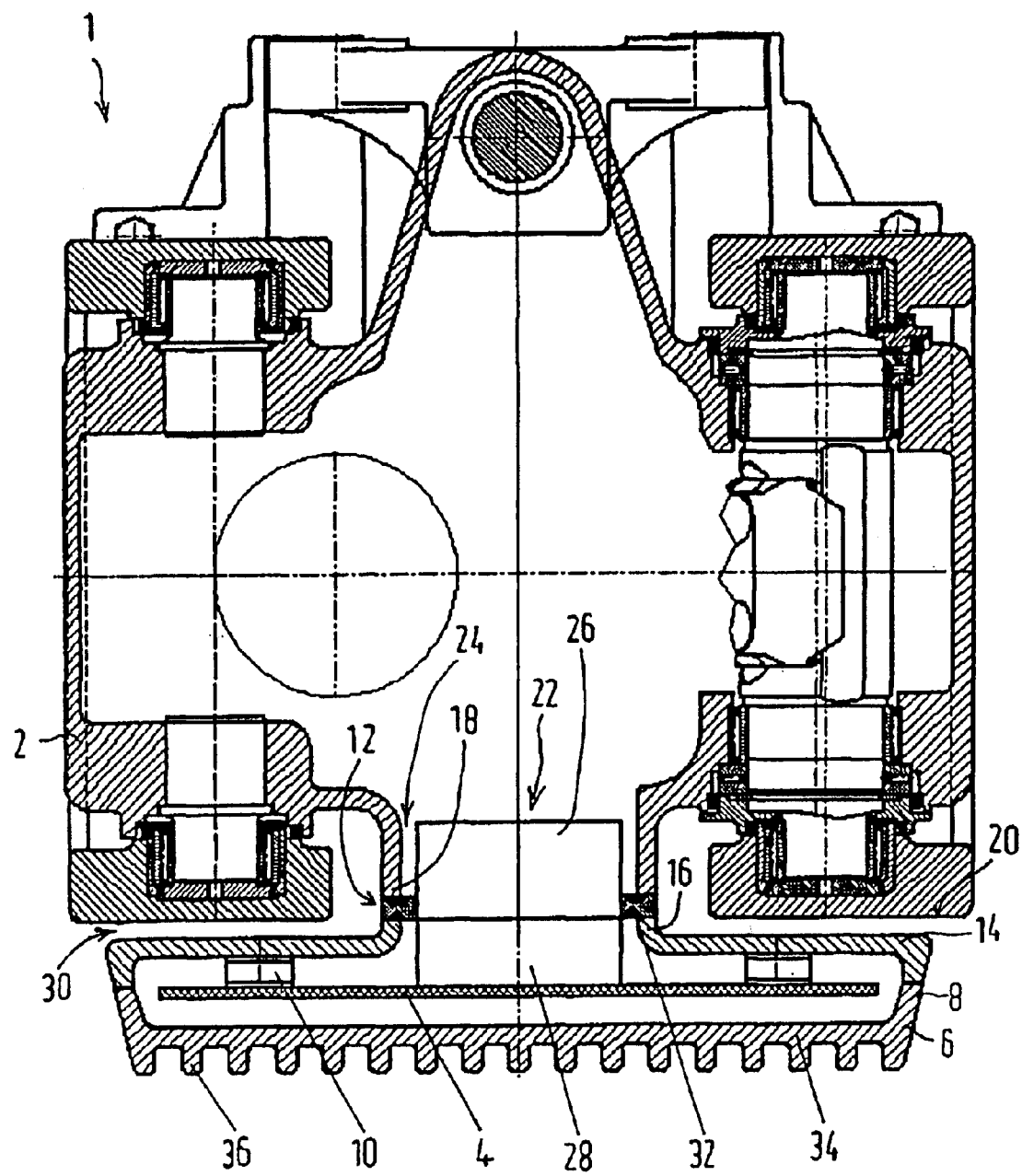

ELECTROMECHANICAL BRAKE ACTUATOR

BACKGROUND AND SUMMARY OF THE INVENTION

The present invention relates to an electromechanical brake actuator for a rail vehicle brake comprising an actuator housing as well as electronic components, such as power electronics, control electronics or an electronic sensor system. At least some of the electronic components are accommodated in a separate electronic system housing which is detachably connected with the actuator housing. A brake actuator of this type is known, for example, from U.S. Pat. No. 5,692,586.

Currently, three wheel brake systems are essentially used in the rail vehicle field: Pneumatic or electropneumatic brake systems, hydraulic or electrohydraulic brake systems as well as mechanical or electromechanical brake systems. A wheel brake system may be constructed as an active or passive brake system, depending on whether the force of a brake actuator has to be applied for braking (active brake system) or for releasing the brake (passive brake system). In the event of operating disturbances, in the case of pneumatic systems, an energy accumulation takes place in compressed-air reservoirs; in the case of hydraulic systems, this energy accumulation takes place in hydraulic reservoirs; and, in the case of electromechanical systems, it takes place in the form of pre-loaded springs.

In the case of electromechanical brake actuators, an electric-motor drive is used as the service brake device, which can be controlled by control or power electronics to carry out slip-controlled or load-corrected brakings. When the brake actuator, together with the electronic components assigned to it, is to be fastened as an integrated brake module to the bogie or truck of a rail car, the problem arises that shock or vibration stress is caused, for example, by rail joints or switching shocks that may result in damage to the electronic components. Furthermore, particularly at high ambient temperatures, the electronic components may be subjected to a temperature-caused stress which leads to disturbances or to total failure.

The present invention further develops an electromechanical brake actuator of the initially mentioned type such that its electronic or electrical components have a greater reliability and a longer service life.

Thus, the present invention relates to an electromechanical brake actuator for a rail vehicle brake comprising: an actuator housing having a flange; electronic components; an electronic system housing having a flange detachably connected with the actuator housing, and at least some of the electronic components being in the electronic system housing; at least one vibration damping element of the detachable connection arranged between a flange of the actuator housing and a flange of the electronic housing; and a clearance existing between the electronic system housing and the actuator housing.

As a result of the flexible and vibration-damping element or flange connection between the electronic system housing and the actuator housing, the electronic components are uncoupled with respect to vibrations from the structure born noise of the actuator housing. In particular, the natural frequencies of the electronic unit are thereby displaced toward lower values, whereby higher-frequency excitations can no longer cause sympathetic vibrations. Furthermore, lower vibration amplitudes are obtained because of the energy loss in the damping elements.

As a result of the fact that, with the exception of the flange connection, clearance exists between the electronic system housing and the actuator housing, the presence of an insulating air layer or of a cooling air flow is permitted between the actuator housing heated by the operation of the electric drive and the electronic system housing. That permits the thermal stress acting upon the electronic components to be reduced.

The vibration-damping element or devices are preferably formed by a rubber ring which is arranged between the flange of the actuator housing and the flange of the electronic system housing. As a result, the rubber ring is situated in the flux or transmission of force between the actuator housing and the electronic system housing and vibrationally uncouples the latter from the actuator housing.

According to a preferred embodiment of the present invention, at least some of the electronic components are arranged on at least one printed circuit board which, inside the electronic system housing, is accommodated by at least one other vibration-damping element or device. This results in an additional vibration uncoupling of the electronic system components from the structure-borne sound guiding actuator housing or also from the electronic system housing.

A plug, which is assigned to the electronic system housing or to the actuator housing or a bushing assigned to the electronic system housing or the actuator housing is fastened to the actuator housing or to the electronic system housing, also in a vibration-damped manner. As a result, no stiff vibration-transmitting bridges can be created in the plug/bushing area.

Other aspects and novel features of the present invention will become apparent from the following detail description of the invention when considered in conjunction with the accompanying drawings.

BRIEF DESCRIPTION OF THE DRAWINGS

FIG. 1 is a cross-sectional view of a brake actuator, according to the present invention.

DETAILED DESCRIPTION OF THE PREFERRED EMBODIMENTS

A preferred embodiment of an electromechanical brake actuator 1 of a rail vehicle, as shown in FIG. 1, comprises an electric drive, such as an electric servo motor, which, for reasons of scale and convenience, is not shown but which is accommodated in an actuator housing 2. The servo motor (not shown) causes a rotation of a brake spindle, which is also not shown and acts upon a power converter (not shown) which converts rotating movements of the brake spindle into a brake application movement of brake linings in the direction of an axle-mounted brake disk (not shown). The actuator housing 2 is held on a bogie or truck (not shown) of the rail vehicle (not shown) in an area of the axle-mounted brake disk, which bogie is exposed to vibrations.

The brake actuator 1 further comprises electrical or electronic components, such as an electronic control and power system (not shown) for controlling the servo motor. Of these electrical or electronic components, at least some are arranged on a printed circuit board 4 which is held within a separate electronic system housing 6 consisting of two half-shells. Toward all sides, the printed circuit board 4 may be spaced away from a housing wall 8 of the electronic system housing 6 and may be connected with an upper wall 14 by pin-shaped damping devices 10 which preferably are of rubber construction but may be of spring construction or equivalent.

The electronic housing 6 may be preferably detachably fastened to the actuator housing 2 by a flange connection 12 on a bottom 20 of the actuator housing 2. For this purpose, an upward-pulled surrounding flange 16 may be molded to the upper housing wall 14 of the electronic housing 6, which flange 16 may be situated opposite a respective complementary flange 18 of the actuator housing 2. A flange opening 24 receiving a plug/bushing connection 22 extends within or between the two flanges 16, 18, through which flange opening 24, mutually assigned electrical cables (not shown) of the servo motor and of the electronic control and power system accommodated by the printed circuit board 4 are detachably connected with one another. A plug 26 may be connected to one of the actuator housing 2 and the electronic system housing 6 and may also be fastened to one of the actuator housing 2 and electronic system housing 6 in a vibration-damped manner. A bushing 28 may be connected to one of the actuator housing 2 and electronic system housing 6 and may also be fastened in a vibration damped manner to one of the actuator housing 2 and the electronic system housing 6. The bushing 28 may be connected with the printed circuit board 4, which may be vibration-damped anyhow, and may project so far away from the circuit board 4 in an upward direction (as shown in FIG. 1) that the plug 26 may engage in the bushing 28 when the electronic system housing 6 is flanged to the actuator housing 2.

With the exception of the flange connection 12, a clearance 30 may exist between the upper housing wall 14 of the electronic system housing 6 and the bottom 20 of the actuator housing 2, in which clearance 30 ambient air can circulate. A damping element 32, which may be constructed as an elastic rubber ring or spring, may be arranged between faces of flanges 16, 18 and held there by suitable measures. The damping element 32 is therefore included in a flux or transmission of force between the actuator housing 2 and the electronic system housing 6. A bridging of the elastic damping element 32 by stiff or rigid connection elements is preferably not provided.

On its bottom wall or side 34 pointing away from actuator housing 2, the electronic system housing 6 may be provided with cooling ribs 36 and, in addition, may be arranged in or adjacent an area of the actuator housing 2 which is at least partially exposed to an air current caused by the operation of the rail vehicle.

Although the present invention has been described and illustrated in detail, it is to be clearly understood that this is done by way of illustration and example only and is not to be taken by way of limitation. The spirit and scope of the present invention are to be limited only by the terms of the appended claims.

List of Reference Numbers
1 Brake actuator
2 actuator housing
4 printed circuit board
6 electronic system housing
8 housing wall
10 damping element
12 flange connection
14 upper housing wall
16 flange electronic system housing
18 flange actuator housing
20 actuator housing bottom
22 plug/bush connection
24 flange opening
26 plug
28 bush
30 clearance
32 damping element
34 electronic system housing bottom
36 cooling ribs.

What is claimed is:

1. An electromechanical brake actuator for a rail vehicle brake, comprising:

an actuator housing having a flange;
   electronic components;
   an electronic system housing having a flange and detachably connected with the actuator housing, and at least some of the electronic components being in the electronic system housing;
   at least one vibration damping element of the detachable connection arranged between a flange of the actuator housing and a flange of the electronic housing; and
   with the exception of the detachable connection via the at least one vibration dampening element, a clearance exists between the two housings.

2. The electromechanical brake actuator according to claim 1, wherein at least some of the electronic components are arranged on at least one printed circuit board which, within the electronic system housing, is connected with at least one vibration-damping device.

3. The electromechanical brake actuator according to claim 2, wherein the vibration-damping elements and devices are one of rubber and spring construction.

4. The electromechanical brake actuator according to claim 1, wherein the vibration-damping element is formed as a rubber ring between the flange of the actuator housing and the flange of the electronic system housing.

5. The electromechanical brake actuator according to claim 1, wherein a plug bushing connection is arranged in a flange opening.

6. The electromechanical brake actuator according to claim 1, wherein a plug connected to one of the electronic system housing and the actuator housing is fastened in a vibration-damping manner to one of the actuator housing and the electronic system housing.

7. The electromechanical brake actuator according to claim 1, wherein the electronic system housing has cooling ribs at least on a side pointing away from the actuator housing.

8. The electromechanical brake actuator according to claim 1, wherein the electronic system housing is arranged in an area of the actuator housing which is at least partially exposed to an air current caused by the operation of the rail vehicle.

9. The electromechanical brake actuator according to claim 1, wherein a bushing is connected to one of the electronic system housing and the actuator housing, and is fastened in a vibration-damping manner to one of the actuator housing and the electronic system housing.

* * * * *